United States Patent [19]

Jansen, Jr.

[11] 4,093,281
[45] June 6, 1978

[54] METHOD AND APPARATUS FOR AXIALLY LOADING THREADED CONNECTORS

[75] Inventor: Martin B. Jansen, Jr., Houston, Tex.

[73] Assignee: Vetco Offshore Industries, Inc., Ventura, Calif.

[21] Appl. No.: 742,072

[22] Filed: Nov. 15, 1976

[51] Int. Cl.² .................................................. F16L 55/00
[52] U.S. Cl. ......................................... 285/39; 29/452; 285/334
[58] Field of Search .................. 285/18, 39, 333, 334, 285/355, 390, 89, 92; 403/320, 343; 29/452, 446, 237; 254/29 R, 29 A

[56] References Cited

U.S. PATENT DOCUMENTS

| | | | |
|---|---|---|---|
| 2,671,949 | 3/1954 | Welton | 254/334 X |
| 2,866,370 | 12/1958 | Biach | 285/18 X |
| 3,466,738 | 9/1969 | Mount | 285/18 X |
| 3,749,362 | 7/1973 | O'Connor | 254/29 A |
| 3,995,828 | 12/1976 | Orban | 254/29 A |

FOREIGN PATENT DOCUMENTS 1,248,507  11/1960  France ....................... 285/89

Primary Examiner—Dave W. Arola
Attorney, Agent, or Firm—Subkow and Kriegel

[57] ABSTRACT

A threaded connector for a pipe string, such as a production riser used in connection with sub-aqueous wells, in which the threaded connection between the pin member and box member of the connector is made up initially through an application of relatively low torque to the members, after which the connector has a straight line pretension force of a high tensile value applied to it through use of a suitable tool, the high pretension force being retained between the mating threads of the pin and box members by a preload reaction member threaded on the pin member and rotated into solid engagement with the box member while the pretension force is being applied, to lock the preload in the connector between the threads.

26 Claims, 3 Drawing Figures

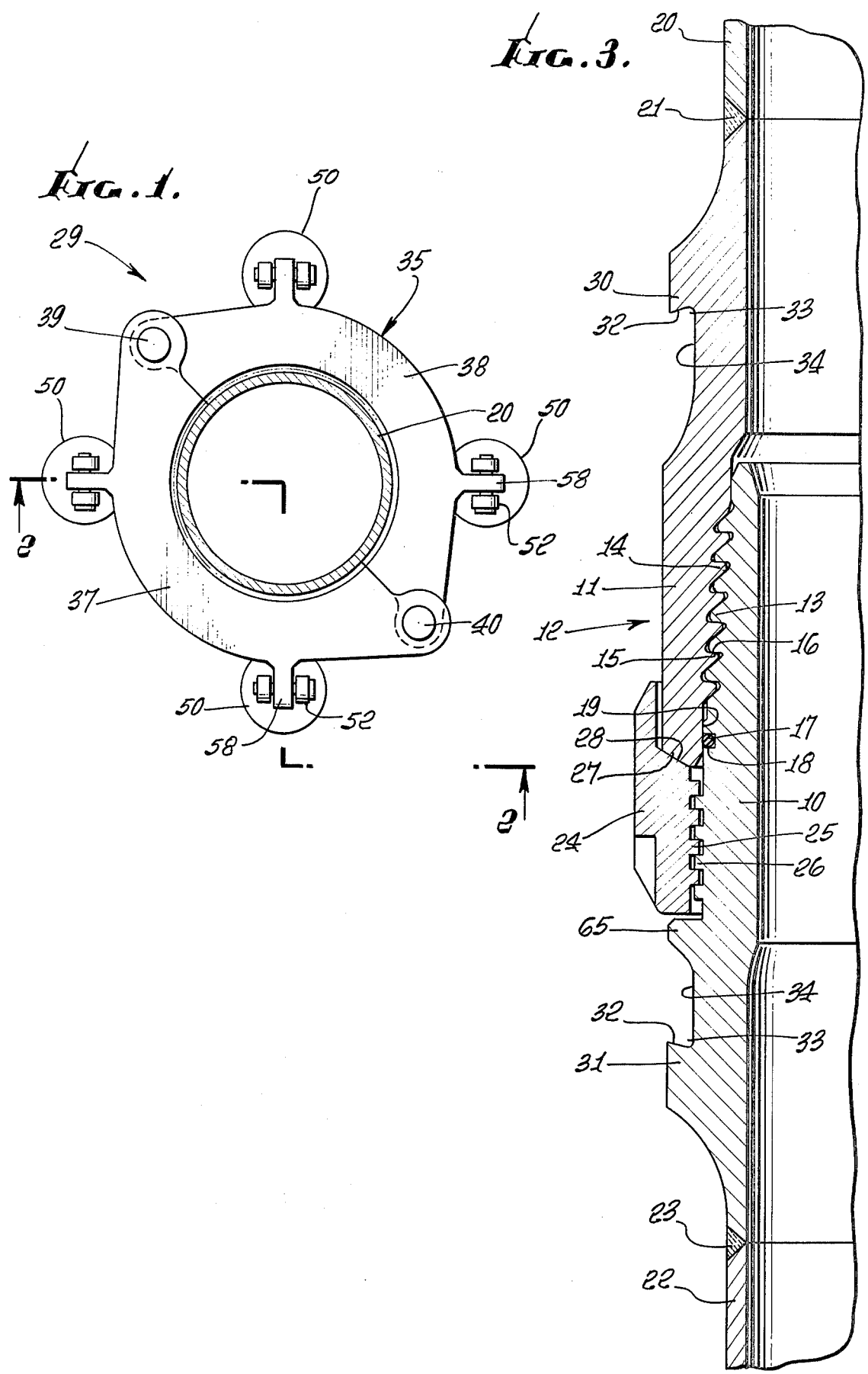

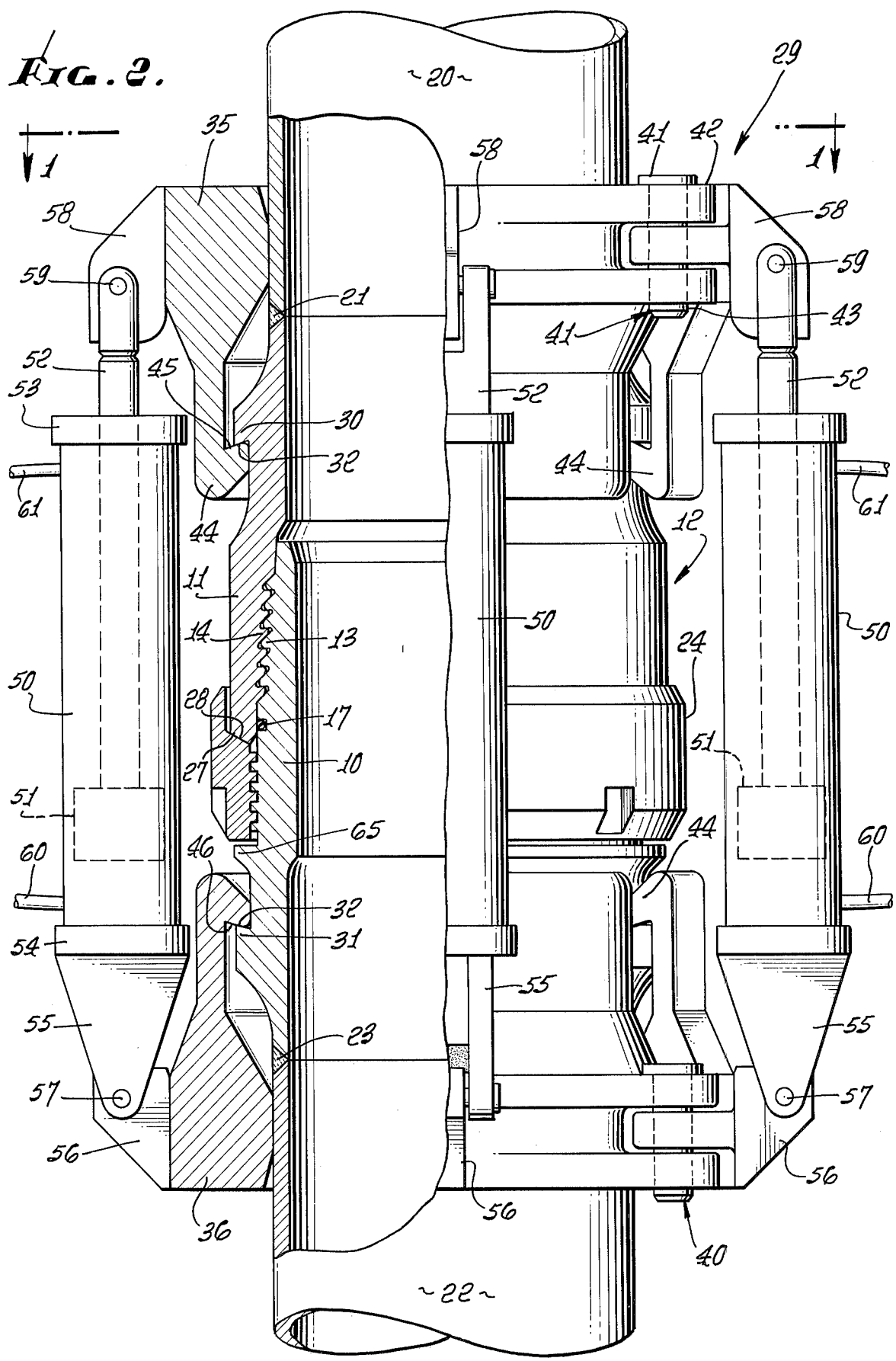

METHOD AND APPARATUS FOR AXIALLY LOADING THREADED CONNECTORS

The present invention relates to threaded pipe connectors, and more particularly to the application and retention of high axial preloading between the pin member and box member of each threaded connector of a pipe string, such as a marine riser used in connection with sub-aqueous wells.

Certain marine risers require connectors that can withstand high load fluctuations over a long period, such as twenty years. A connector is, therefore, required having a high fatigue strength and long fatigue life. Threaded connectors and dog type connectors have been used heretofore, the threaded connectors possessing certain advantages over the dog type since stress distribution within the connector for axial loads and bending loads is uniform and not subject to highly localized stresses encountered in the dog type of connector. As a result, the use of threaded connectors is preferred in view of its greater fatigue life.

Heretofore, one of the disadvantages of the threaded connector has been the inability to make up the connector to the required axial preloads with conventional torquing equipment. As an example, a 20 inch diameter connector of a typical and known type requires a torque of $0.4 \times 10^6$ ft.-lbs. to attain an axial preload between the connector threads of $2 \times 10^6$ lbs., which has been difficult to achieve.

Accordingly, it is an object of the present invention to provide a threaded connection to which a desirable high preload can be applied, the connection requiring relatively low torque application while being made up. An axial preload of $2 \times 10^6$ lbs., in the example given above, can be achieved with the imposition of low torque readily supplied through the use of conventional torquing equipment.

In general, the invention contemplates a threaded connector which is intially made up with a relatively low torque, a suitable tool, such as a fluid actuated cylinder and piston mechanism, then being used to pretension the force between the connector threads to a desired value, such as the $2 \times 10^6$ lbs. noted above, and, while a pretensile force is being maintained, rotating a reaction member or ring, which is threaded on one portion of the connector, into firm engagement with a companion portion of the connector to lock the parts in their highly pretensioned and preloaded condition, in order that release of the pretension mechanism results in the high preload force (such as $2 \times 10^6$ lbs.) being retained between the connector threads by the reaction member. At no time is it necessary to apply a high make-up torque to the connector, the high preload being achieved through the imposition of a high axially applied tensile force to the threaded connector members.

This invention possesses many other advantages and has other purposes which may be made more clearly apparent from a consideration of a form and method embodying the invention. This form and method are shown and described in the present specification and in the drawings accompanying and constituting a part thereof. They will now be described in detail, for the purpose of illustrating the general principles of the invention; but it is to be understood that such detailed description is not to be taken in a limiting sense.

Referring to the drawings:

FIG. 1 is a cross-section, on a reduced scale, taken along the line 2—2 of FIG. 2;

FIG. 2 is a longitudinal section, on an enlarged scale, taken along the line 2—2 on FIG. 1; and FIG. 3 is an enlarged partial longitudinal section of the completely made up and pretensioned connector disclosed in FIG. 2.

As disclosed in the drawings, a threaded connection is applied between the pin member 10 and box member 11 of a connector 12. As illustrated, the threads 13, 14 are of the tapered buttress type, the coengaging faces 15, 16 between the pin member threads and the box member threads being substantially normal to the axis of the connector. Leakage of fluid between the pin and box members is prevented by a suitable seal 17, such as an O-ring mounted in the suitable groove 18 of the pin member engaging the inner wall 19 of the box member below its threads. The upper end of the box member 11 is suitably secured to a section 20 of a production riser, as by means of a weld 21, the lower end of the pin member 10 being secured to a lower production riser section 22 by means of a weld 23.

It is desirable to provide a tight threaded connection in which there is a preload between the pin thread faces 15 and box thread faces 16. As noted above, large axial preloads, which are necessary to provide a connector with a high fatigue strength and long fatigue life, cannot be secured through use of conventional torquing equipment. In the present case, the making up of the threaded connection of the connector does not require a high torque to be imposed on the box member and pin member. Instead, after the box member 11 and pin member 10 have been made up into secure threaded engagement with each other, but at a relatively low torque, the normal thread faces 15, 16 are preloaded by exerting appropriate tension on the box and pin members, that is, by exerting an upward force on the box member 11 (as illustrated in the drawings) and a downward force on the pin member 10. While the desired preloading force is being exerted, the box member and pin member are locked in their tensioned or stressed condition by a preload reaction member 24 which may be in the form of a ring having internal square threads 25 meshing with companion external square threads 26 on the pin member 10 located below the lower end or shoulder 27 of the box member. Sufficient torque is applied to the reaction member 24 to firmly engage its shoulder 28 with the lower end 27 of the box member. Thereafter, the tensioning force on the box member and pin member can be relieved, the preload between the normal faces 15, 16 being retained by the reaction member 24, as disclosed in FIGS. 2 and 3.

The axial preload is applied by a preloading tool 29 which is caused to engage a flange 30 on the box member 11 and also a flange 31 on the pin member 10. These flanges are oppositely arranged with respect to each other, and have their inner surfaces 32 tapered in a direction toward each other to provide acute angle upper and lower grooves 33 with respect to the adjacent peripheries 34 of the box member and pin member. Each groove, in effect, is undercut to provide a circumferentially continuous hook-like flange.

The preloading tool 29 illustrated in the drawings includes an upper frame 35 and a lower frame 36, each of which is split into two halves 37, 38 in clam shell fashion. Each of the frames is adapted to fit around the connector, as described hereinbelow. At one side the halves of each frame are secured together by a hinge pin 39 to enable the frame halves to swing relative to each other. When the frame halves of each frame are closed around the pin or box, as described hereinbelow, they are secured in the closed position by a lock pin 40, which is readily removable. As disclosed most clearly in FIG. 2, each lock pin has an upper head 41 adapted to bear against an upwardly directed surface 42 of one of the frame halves, the pin shank 43 extending through aligned holes in the frame halves to secure them together in the position illustrated in the FIGS. 1 and 2.

The upper and lower frames 35, 36 extend axially toward each other, each frame including circumferentially spaced hook portions 44 adapted to coact with a companion tapered flange 30 or 31. As disclosed, the upper frame or reaction ring 35 has its hook portions 44 located under the upper tapered flange 30 on the box member, the hooks having a tapered surface 45 conforming to the taper of the upper flange. Similarly, the lower frame 36 has its hook portions disposed above the tapered flange 31 of the pin member, these hook portions having a tapered surface 46 conforming to the tapered surface 32 of the lower flange 31.

The preloading tool 29 includes a plurality of circumferentially spaced longitudinally disposed cylinders 50, each of which contains a piston 51 secured to a piston rod 52 that extends upwardly through the upper rod end 53 of the cylinder. Each cylinder includes a lower head 54 having spaced arm portions 55 straddling a radial projection or ear 56 of the lower frame member 36, the arm portions and projection being secured together by a pin 57. Similarly, the upper portion of each piston rod 52 is bifurcated and straddles an upper radial projection or ear 58 of the frame 35, being secured to the projection by means of a pin 59.

Fluid, such as a hydraulic fluid under pressure, is introduced through a lower line 60 into the lower end of each cylinder to shift the piston 51 upwardly in each cylinder and thereby exert an upward force on the upper frame 35. Simultaneously, the fluid under pressure is acting on the lower cylinder heads 54 to urge the lower frame 36 in a downward direction. Relative movement between the cylinder and piston of each cylinder and piston combination in the opposite direction is obtained by bleeding the fluid under pressure from the lower cylinder head through the line 60 and introducing fluid under pressure through an upper line 61 communicating with the piston rod end of the cylinder.

In the use of the apparatus illustrated, the preload reaction member 24 initially occupys its lowermost position on the pin member 10 in engagement with a pin member flange 65. The pin and box members are threadedly secured to one another and an appropriate torque imposed thereon to snugly secure the buttress threads to one another. At this time the preload reaction member 24 will be spaced slightly from the lower end 27 of the box member. After removing the lock pins 40, the upper and lower frames 35, 36 are swung to fully open positions around their hinge pins 39 and the preloading tool placed laterally around the connector 12 and the frames swing inwardly to a fully closed position to locate the hook portions 44 below the upper tapered flange 30 and the lower hook portions 44 above the lower tapered flange 31. The lock pins 40 are then inserted through the frame halves 37, 38 to secure the upper and lower frames in their closed positions.

Fluid under pressure is then introduced into the lower portions of the cylinders 50 below the pistons 51, urging the cylinders and lower frame 36 in a downward direction, and the pistons, piston rods 52, and upper frame 35 in an upward direction, the upper and lower hook portions 44 engaging the upper and lower tapered flanges 30, 31 of the box member 11 and pin member 10, respectively. The hydraulic force applied to the lower portion of the cylinders is exerted through the cylinders, pistons, and piston rods, against the upper and lower frames 35, 36 to produce an upward axial tensile force on the box member 11 and a downward axial tensile force on the pin member 10, forcing or preloading the normal faces 15, 16 of the buttress threads against one another. When this axial preload reaches a predetermined value, which in the example given above could be $2 \times 10^6$ lbs. for a 20 inch pipe connector, such preload is retained while the reaction member 24 is turned on the pin member 10 and sufficient torque applied thereto to engage the reaction member shoulder 28 tightly against the lower end 27 of the box member, thereby locking the box member 11 and pin members 10 in their relative position and condition to which they have been stressed by the preloading tool 29, the preloading force being retained between the thread faces 15, 16, which are normal to the axis of the connector.

The fluid pressure can then be relieved from the lower ends of the cylinders, and, if necessary, the fluid pressure can be introduced into the rod ends of the cylinders 50 to collapse the pistons 51 and piston rods 52 within the cylinders and remove the hook portions 44 from engagement with their respective tapered flanges 30. The lock pins 40 can be removed and the halves of each frame of the preloading tool swung outwardly about the frame hinge pins 39 to permit complete lateral removal of the preloading tool 29 from the connector 12, leaving the latter in its preloaded condition, as disclosed in FIG. 3.

It is, accordingly, apparent that an apparatus has been provided which enables the connector to be made up in the conventional way to a desired torque, which is substantially less than the torque that would be required to secure the desired preload in the connector The fluid actuated tool 29 is then used to tension the box member 11 and pin members 10 to the extent at which the desired preload is secured. Such preload is obtained through a straight line action and without the necessity for exerting further torque on the box member and pin member. The reaction member 24 is readily threaded upwardly against the box member to lock or retain the preload in the connector despite relieving of the hydraulic pressure in the preloading tool and removal of the tool from the connector.

I claim:

1. A pipe connector comprising, in combination; a tubular pin member having an external thread and a tubular box member having an internal thread meshing with said external thread, means for applying axially directed tensil forces in opposite directions to said pin member and box member, respectively, to preload engaging faces of said meshing threads against one another, and means for retaining said preload between said engaging faces while said axially directed tensile forces are applied and after application of said axially directed tensile forces has been discontinued.

2. The combination as defined in claim 1; said retaining means including a device on one of said members shiftable into engagement with the other of said members.

3. The combinations as defined in claim 1; said retaining means including a device threaded on one of said members and adapted to be rotated and shifted axially into engagement with the other of said members.

4. The combination as defined in claim 1; said retaining means including a device threaded on said pin member and adapted to be rotated and shifted axially into engagement with said box member.

5. The combination as defined in claim 1; said force applying means including a preloading tool having one portion engageable with said pin member and another portion engageable with said box member, and further comprising means for shifting said portions in opposite axial directions to exert an axial tensile force in one direction on said pin member and an axial tensile force in the opposite direction on said box member.

6. The combination as defined in claim 1; said force applying means including a preloading tool comprising one portion engaged with said pin member and another portion engageable with said box member, and further comprising cylinder means and piston means in said cylinder means, one of said cylinder means and piston means being connected to said one portion and the other said cylinder means and piston means being connected to said another portion, whereby the feeding of fluid under pressure into said cylinder means shifts said cylinder means and piston means in opposite axial directions to correspondingly shift said portions in opposite axial direction and exert an axial tensile force in one direction on said pin member and an axial tensile force in the opposite direction on said box member.

7. The combination as defined in claim 5; each of said portions being composed of at least two parts to enable said portions to be moved laterally inwardly around said pin member and box member into engagement therewith.

8. The combination as defined in claim 6; each of said portions being composed of at least two parts to enable said portions to be moved laterally inwardly around said pin member and box member into engagement therewith.

9. The combination as defined in claim 1; said pin member and box member each having an external flange, said force applying means including a preloading tool having one portion engageable with said pin member flange and another portion engageable with said box member flange, and further comprising means for shifting said portions in opposite axial directions against said flanges to exert an axial tensile force in one direction on said pin member and an axial tensile force in the opposite direction on said box member.

10. The combination as defined in claim 9; said shifting means comprising cylinder means and piston means in said cylinder means, one of said cylinder means and piston means being connected to said one portion and the other of said cylinder means and piston means being connected to said another portion, whereby the feeding of fluid under pressure to said cylinder means shifts said cylinder means and piston means in opposite axial directions to correspondingly shift said portions in said opposite axial directions.

11. The combination as defined in claim 10; each of said portions being composed of at least two parts to enable said portions to be moved laterally inwardly around said pin member and box member into engagement therewith.

12. The combination as defined in claim 2; said force applying means including a preloading tool having one portion engageable with said pin member and another portion engageable with said box member, and further comprising means for shifting said portions in opposite axial directions and exert an axial tensile force in one direction on said pin member and an axial tensile force in the opposite direction on said box member.

13. The combination as defined in claim 3; said force applying means including a preloading tool having one portion engageable with said pin member and another portion engageable with said box member, and further comprising means for shifting said portions in opposite axial directions and exert an axial tensile force in one direction on said pin member and an axial tensile force in the opposite direction on said box member.

14. The combination as defined in claim 4; said force applying means including a preloading tool comprising one portion engaged with said pin member and another portion engageable with said box member, and further comprising cylinder means and piston means in said cylinder means, one of said cylinder means and piston means being connected to said one portion and the other said cylinder means and piston means being connected to said another portion, whereby the feeding of fluid under pressure unto said cylinder means shifts said cylinder means and piston means in opposite axial directions to correspondingly shift said portions in opposite axial directions to exert an axial tensile force in one direction on said pin member and an axial tensile force in the opposite direction on said box member.

15. The combination as defined in claim 9; said retaining means including a device on one of said members shiftable into engagement with the other of said members.

16. The combination as defined in claim 10; said retaining means including a device threaded on said pin member and adapted to be rotated and shifted axially into engagement with said box member.

17. A pipe connector comprising a tubular pin member having an external thread and a tubular box member having an internal thread meshing with said external thread, said pin member having an external thrust surface for receiving a preloading tool bearing thereagainst, said box member having an external thrust surface for receiving a preloading tool bearing thereagainst, said thrust surfaces confronting each other to enable said preloading tool to apply tensile forces to said pin and box members, and a device on one of said members shiftable into engagement with the other of said members to retain an axial preload imposed on the engaging faces of said meshing threads.

18. A connector as defined in claim 17; said external thrust surfaces being provided on external flanges on said pin member and box member.

19. A connector as defined in claim 18; said device being threaded on one of said members and adapted to be rotated and shifted axially into engagement with the other of said members.

20. A connector as defined in claim 18; said device being threaded on said pin member and adapted to be rotated and shifted axially into engagement with said box member.

21. The method of imparting an axial preload to the engaging faces of meshing threads of a tubular pin member and a companion tubular box member, comprising applying torque to said members of a relatively low torque value to initially preload the engaging thread faces, applying opposite axial tensile force to said pin member and box member to provide a greater final axial preload between said engaging thread faces substantially exceeding said initial preload, and locking said members together to prevent relaxing of said final preload upon release of said axial tensile force.

22. The method defined in claim 21; said axial tensile force being supplied by releasably engaging a preloading tool to said box member and pin member, said tool including cylinder and piston means, and directing fluid under pressure into said cylinder and piston means to apply said axial tensile force in one longitudinal direction to said box member and in the opposite longitudinal direction to said pin member.

23. The method as defined in claim 21; said members being locked together by threading a retaining device on one of said member and rotating said device into firm engagement with the other of said members.

24. The method as defined in claim 21; said members being locked together by threading a retaining device on said pin member and rotating said device into abutting engagement with an end of said box member.

25. A pipe connector structure comprising: a tubular pin and a tubular box in coaxial engagement; said pin and box having companion confronting transverse surfaces engaged with one another to hold said pin and box against separation; means for applying opposite axial forces to said pin and box to preload said surfaces; and locking means including a member coengaged between oppositely facing additional surfaces of said pin and box for maintaining said preload when said opposite axial forces are relaxed.

26. A pipe connector structure as defined in claim 25; said means for applying opposite axial forces including a preloading tool having one portion engageable with said pin and another portion engageable with said box, and further comprising means for shifting said portions in opposite axial directions to exert opposite axial forces to said pin and to said box.

* * * * *